(12) United States Patent
Yamazaki et al.

(10) Patent No.: US 7,605,561 B2
(45) Date of Patent: Oct. 20, 2009

(54) METHOD FOR CONTROLLING CHARGING OF A POWER SOURCE OF A HYBRID VEHICLE

(75) Inventors: Mark Yamazaki, Canton, MI (US); John Blankenship, Dearborn, MI (US); Francis T. Connolly, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 759 days.

(21) Appl. No.: 10/711,499

(22) Filed: Sep. 22, 2004

(65) Prior Publication Data

US 2006/0061322 A1     Mar. 23, 2006

(51) Int. Cl.
   *H02J 7/14* (2006.01)
(52) U.S. Cl. .................. 320/104; 320/132; 903/907
(58) Field of Classification Search .......... 320/132, 320/104; 324/427; 903/904, 907
   See application file for complete search history.

(56) References Cited

U.S. PATENT DOCUMENTS

| 5,873,801 | A | * | 2/1999 | Taga et al. ............... 477/5 |
| 5,903,061 | A | * | 5/1999 | Tsuzuki et al. ........ 290/40 C |
| 6,090,007 | A | * | 7/2000 | Nakajima et al. ........ 477/46 |
| 6,672,415 | B1 | * | 1/2004 | Tabata ................ 180/65.2 |
| 6,960,152 | B2 | * | 11/2005 | Aoki et al. .............. 477/3 |
| 2002/0107618 | A1 | * | 8/2002 | Deguchi et al. .......... 701/22 |

* cited by examiner

*Primary Examiner*—Patrick J Assouad
*Assistant Examiner*—Aaron Piggush
(74) *Attorney, Agent, or Firm*—David B. Kelley; Brooks Kushman P.C.

(57) ABSTRACT

A method for controlling charging of a power source of a hybrid vehicle. The method includes determining a maximum output level of a primary power source, determining a state of charge of a secondary power source, determining a charge torque modifier value based on the maximum output torque level and the state of charge, determining a target torque level for an electrical machine based on the charge torque modifier value, and driving the electrical machine at the target torque level with the primary power source to charge the secondary power source.

20 Claims, 4 Drawing Sheets

METHOD FOR CONTROLLING CHARGING OF A POWER SOURCE OF A HYBRID VEHICLE

BACKGROUND OF THE INVENTION

1. Field of the Invention

The present invention relates generally to the control of a hybrid electric vehicle, and more particularly to a method for controlling charging of a power source of a hybrid electric vehicle.

2. Background Art

Hybrid electric vehicles employ a plurality of power sources that provide power to drive vehicle traction wheels and support electrical loads. In the case of a power source that stores energy, such as a battery, it is desirable to maintain a nominal or full state of charge to adequately support electrical loads and provide "boost" to the vehicle drivetrain to support acceleration requests.

If an energy-storing power source becomes depleted, it may be recharged using another power source, such as an engine. Recharging with such a power source reduces the torque available to propel the vehicle. If more wheel torque is needed to accommodate changes in driver demand or road load conditions, then the charging torque must be removed in a way that is imperceptible to the driver, yet provides the desired vehicle performance.

Applicants' of the present invention have discovered that the sensitivity of an accelerator pedal or similar input device may be affected as a power source approaches a full state of charge. More specifically, less torque is utilized to charge a power source as it nears or reaches a full state of charge. Thus, more torque is available to propel the vehicle. As more propulsion torque becomes available, accelerator pedal actuation may produce more torque than expected by the vehicle operator. Consequently, the "feel" of level of responsiveness of the accelerator pedal may change as the power source nears a full state of charge.

Before Applicants' invention, there was a need for an improved method of charging one or more power sources of a hybrid electric vehicle. In addition, there was a need to provide a smooth transition out of a power source charging mode that is not perceived by a vehicle operator and does not degrade vehicle performance. In addition, there was a need to provide a consistent feel or level of responsiveness of an accelerator pedal that is not affected by power source charging. Problems associated with the prior art as noted above and other problems are addressed by the Applicants' invention as summarized below.

SUMMARY OF THE INVENTION

According to one aspect of the present invention, a method for controlling charging of a power source of a hybrid vehicle is provided. The hybrid vehicle includes a set of power sources that includes a primary power source and at least one secondary power source. The hybrid vehicle also includes an electrical machine adapted to be driven by at least one member of the set of power sources.

A method includes the steps of determining a maximum output torque level of the primary power source, determining a state of charge of the secondary power source, determining a charge torque modifier value based on the maximum output torque level and the state of charge, determining a target torque level for the electrical machine based on the charge torque modifier value, and driving the electrical machine at the target torque level with the primary power source to charge the secondary power source.

The primary power source may be an internal combustion engine. The secondary power source may be a battery. The electrical machine may be a starter-alternator or a motor-generator.

The step of determining the maximum output torque level may include determining whether the primary power source is providing output torque.

The step of determining the charge torque modifier value may include comparing the state of charge of the secondary power source to a threshold value, selecting a first adjustment value if the state of charge is less than the threshold value, and selecting a second adjustment value if the state of charge is not less than the threshold value. The first adjustment value may be greater than the second adjustment value and may be a constant based on the maximum output torque level. The second adjustment value may be based on the maximum output torque level and the state of charge and may decrease linearly as the state of charge increases.

The step of determining a charge torque modifier value may be based on the state of charge and an actual output torque of the primary power source expressed as a percentage of the maximum output torque level.

According to another aspect of the present invention, a method for controlling charging of a power source of a hybrid electric vehicle is provided. The hybrid electric vehicle includes the power source, an engine, and an electrical machine selectively coupled to the engine and adapted to charge the power source.

The method includes the steps of determining whether the engine is running, determining whether the electrical machine is being driven by the engine to charge the power source, determining a maximum output torque level of the engine, comparing a state of charge of the power source to a threshold value, selecting an adjustment value based on an amount of torque available for charging the power source, calculating a charge torque modifier value based on the adjustment value, determining a target torque level for the electrical machine based on the charge torque modifier value, and driving the electrical machine at the target torque level with the engine to charge the power source. The charge torque modifier value is a constant if the state of charge is less than the threshold value and decreases as the state of charge increases if the state of charge is greater than the threshold value.

According to another aspect of the present invention, a method of controlling charging of a power source of a hybrid electric vehicle is provided. The hybrid electric vehicle includes a primary power source, a secondary power source, an electrical machine adapted to be driven by the primary or secondary power sources, and an accelerator pedal.

The method includes the steps of determining a maximum output torque level of the primary power source, determining a state of charge of the secondary power source, comparing the state of charge to a threshold value, selecting an adjustment value, determining a charge torque modifier value based on the adjustment value and an actual output torque of the primary power source expressed as a percentage of the maximum output torque level, determining a target torque level for the electrical machine based on the charge torque modifier value, and driving the electrical machine at the target torque level with the primary power source to charge the secondary power source. The target torque level decreases linearly as the output torque of the primary power source increases to provide a consistent level of vehicle acceleration as the accelerator pedal is actuated.

DETAILED DESCRIPTION OF THE PREFERRED EMBODIMENT(S)

Figure 1:
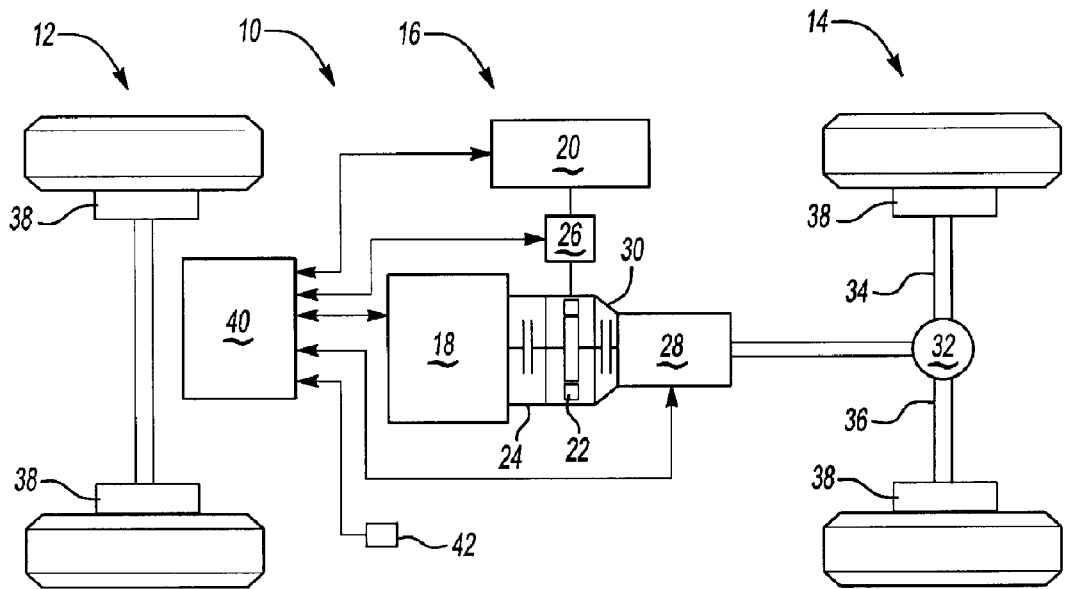
FIG. 1 is a schematic of a hybrid electric vehicle.

Referring to FIG. 1, a schematic of a hybrid electric vehicle 10 is shown. The hybrid electric vehicle 10 includes a first wheel set 12, a second wheel set 14, and a wheel drive system or drivetrain 16.

The drivetrain 16 may be configured to drive or provide torque to the first and/or second wheel sets 12,14. The drivetrain 16 may have any suitable configuration, such as a parallel drive, series drive, or split hybrid drive as is known by those skilled in the art. In the embodiment shown in FIG. 1, a parallel drive configuration is shown.

The hybrid electric vehicle 10 includes any suitable number of power sources. In the embodiment shown in FIG. 1, the hybrid electric vehicle 10 includes a primary power source 18 and a secondary power source 20.

The primary power source 18 may be any suitable energy generation device, such as an internal combustion engine adapted to combust any suitable type of fuel like gasoline, diesel fuel, or hydrogen.

The secondary power source 20 may be of any suitable type. For example, a non-electrical power source, such as a hydraulic power source, may be employed. Optionally, an electrical power source such as a battery, a battery pack having a plurality of electrically interconnected cells, a capacitor, or a fuel cell may be utilized. If a battery is used it may be of any suitable type, such as nickel-metal hydride (Ni-MH), nickel-iron (Ni—Fe), nickel-cadmium (Ni—Cd), lead acid, zinc bromine (Zn—Br), or lithium based. If a capacitor is used it may be of any suitable type, such as an ultra capacitor, super capacitor, electrochemical capacitor, or electronic double layer capacitor as is known by those skilled in the art. For simplicity, the description below will primarily refer to an embodiment of the present invention that incorporates an electrical power source.

The primary and secondary power sources 18,20 are adapted to provide power to the drivetrain 16. The primary power source 18 is selectively coupled to an electrical machine 22, such as a motor, motor-generator, or starter-alternator, via a first clutch 24. If the first clutch 24 is engaged, the primary power source 18 may propel the hybrid electric vehicle 10. If the first clutch 24 is disengaged, the secondary power source 20 may power the electrical machine 22 to propel the hybrid electric vehicle 10. In addition, both the primary and secondary power sources 18,20 may simultaneously provide power to the electrical machine 22.

An inverter 26 may be disposed between the secondary power source 20 and the electrical machine 22. The inverter 26 converts direct current (DC) to alternating current (AC) when current flows from the secondary power source 20 and converts alternating current (AC) to direct current (DC) when current flows to the secondary power source 20.

The electrical machine 22 may be selectively coupled to a power transfer unit 28 via a second clutch 30. The power transfer unit 28 may be of any suitable type, such as a multi-gear "step ratio" transmission, continuously variable transmission, or an electronic converterless transmission as is known by those skilled in the art.

The power transfer unit 28 is adapted to drive one or more vehicle wheels. In the embodiment shown in FIG. 1, the power transfer unit 28 is connected to a differential 32 by a driveshaft. The differential 32 is connected to each wheel of the second wheel set 14 by a shaft 34,36, such as an axle or halfshaft.

The hybrid electric vehicle 10 may be configured with one or more energy recovery devices, such as a regenerative braking system 38 that captures kinetic energy and returns the recovered energy to the secondary power source 20 via the electrical machine 22.

A vehicle system control module 40 may monitor and control various aspects of the hybrid electric vehicle 10. For example, the control module 40 may communicate with the primary power source 18, secondary power source 20, inverter 26, and power transfer unit 28 to monitor and control their operation and performance. In addition, the control module 40 may receive input signals from various components. For example, the control module 40 may receive a signal from an accelerator pedal position sensor 42 indicative of the vehicle acceleration demanded by the driver.

In a hybrid electric vehicle such as that previously described, it is possible to use the electrical machine 22 to provide torque to a primary power source, such as an engine. More specifically, the electrical machine 22 may be powered by one or more secondary power sources 20 and provide torque to the primary power source 18 when the first clutch 24 is engaged. The electrical machine 22 may also act as a generator to charge the secondary power source 20 under various operating conditions. As the secondary power source 20 nears or reaches a nominal or full state of charge, more torque becomes available to propel the vehicle. As a result, the engine or vehicle may surge when the additional torque is provided. Such surges are undesirable since they may be negatively perceived by vehicle occupants.

In addition, the additional torque may alter the sensitivity of the accelerator pedal or a similar input device. As such, different amounts of acceleration may be provided for the same accelerator pedal input. More specifically, more acceleration may be provided when the secondary power source is not being charged as compared to when the secondary power source is being charged given the same actuation of the accelerator pedal. Such changes that affect the sensitivity or "feel" of the accelerator pedal are objectionable to the driver.

Figure 2A:
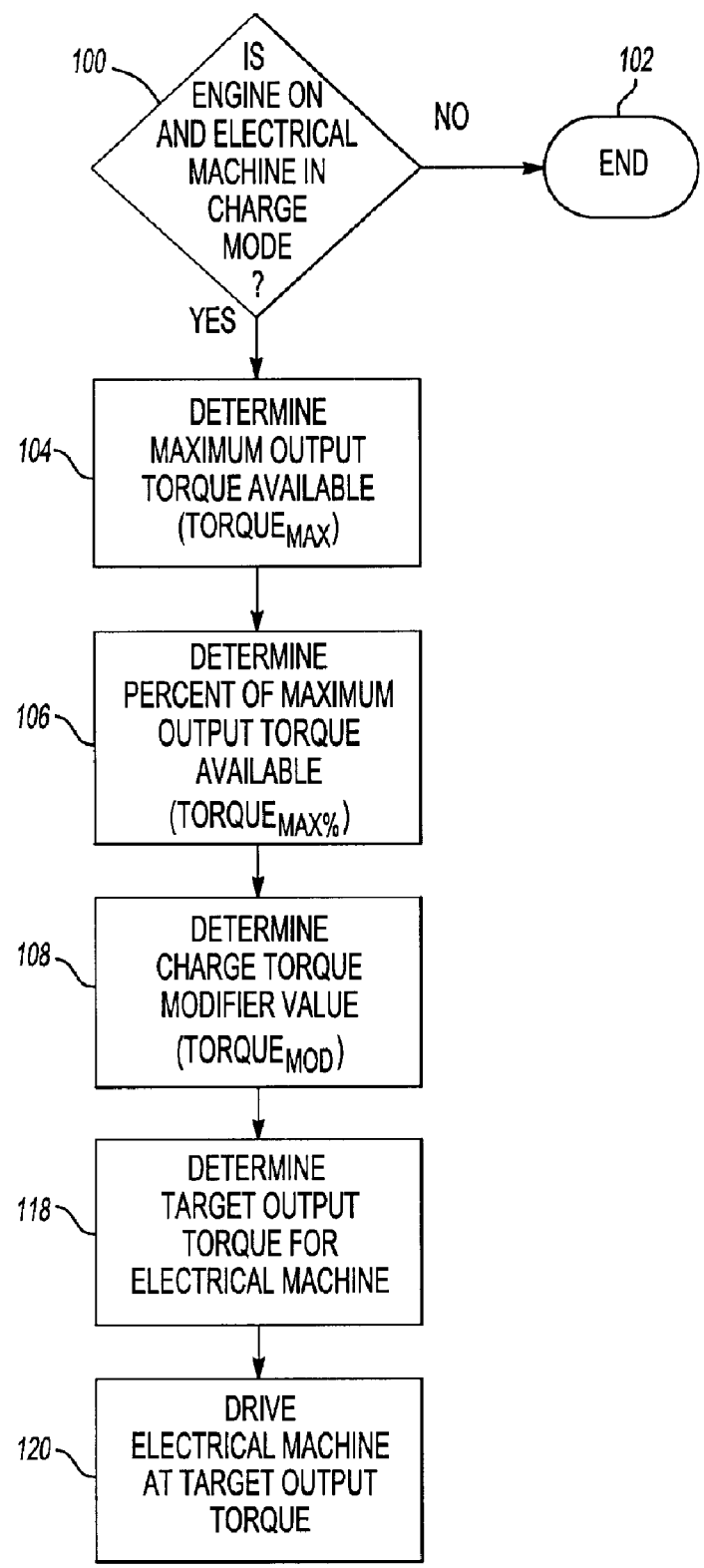
FIG. 2A is a flowchart of a method for controlling charging of a power source of the hybrid electric vehicle.
Figure 2B:
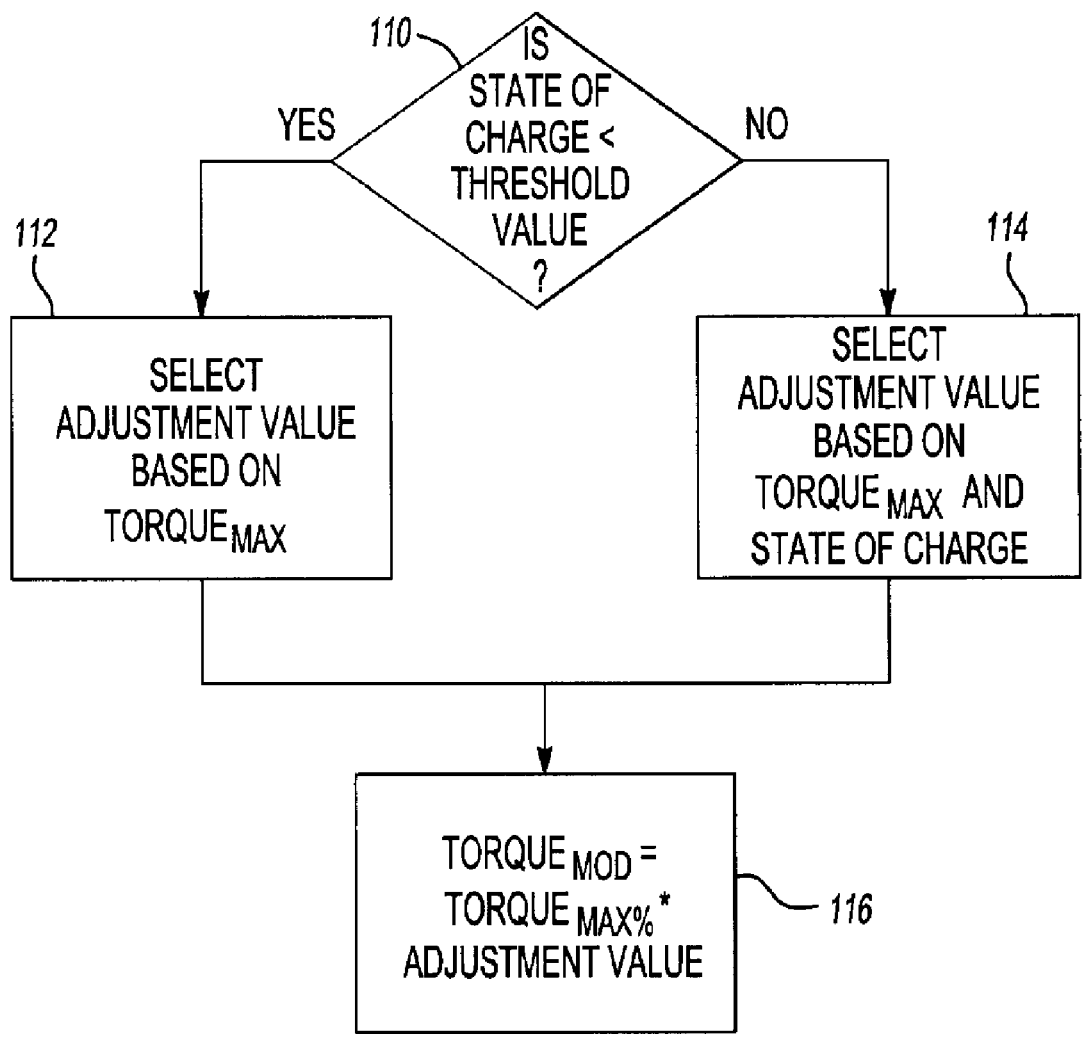
FIG. 2B is a flowchart depicting a method for determining a charge torque modifier value in accordance with the method of FIG. 2A.

Referring to FIGS. 2A and 2B, flowcharts of a method for controlling charging of a power source of the hybrid electric vehicle 10 are shown. As will be appreciated by one of ordinary skill in the art, the flowchart represents control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

The method will be described below with reference to a hybrid electric vehicle that employs an internal combustion engine as the primary power source and a secondary power source that stores an electrical charge. However, this invention contemplates other embodiments that incorporate different types of primary or secondary power sources as previously discussed.

At 100, the method begins by determining whether the engine is "on" or running and whether the electrical machine is in a charge mode. The operating status of the engine may be determined the control module using a signal from the engine or using a signal from a sensor that detects rotation of an engine output shaft. The charge mode of the electrical machine may be based on a signal communicated to the electrical machine to the control module. The electrical machine is in a charge mode when it is providing electrical energy to the secondary power source, such as when the electrical machine is acting as a generator. If the engine is not running or the electrical machine is not in charge mode, then the method ends at block 102. If the engine is on and the electrical machine is in charge mode, the method continues at block 104.

At 104, the method determines a maximum output torque level, designated $Torque_{MAX}$, that may be provided by the engine at the current engine speed. The maximum output torque level will vary as a function of the engine speed and various environmental attributes. More specifically, the maximum output torque increases as the engine speed increases up to the point where the engine is drawing in a maximum amount of fuel mixture. The maximum output torque level may be determined by selecting a value that is associated with the current engine speed and current engine output torque level from a look-up table. Alternatively, the maximum output torque level may be calculated using various signals, such as engine speed, engine torque, ambient temperature, air density, and other attributes in a manner known by those skilled in the art.

At 106, the method calculates the percentage of the maximum output torque level that is available for charging the secondary power source, designated $Torque_{MAX\%}$. $Torque_{MAX\%}$ is determined as a function of the expression:

$$(Torque_{MAX} - Torque_{ACTUAL})/Torque_{MAX}$$

where:

$Torque_{MAX}$ is the maximum output torque level, and $Torque_{ACTUAL}$ is the current output torque of the primary power source.

At 108, the method determines a charge torque modifier value, designated $Torque_{MOD}$. The charge torque modifier value is used to calculate a desired output torque or "charge torque" of the electrical machine as discussed in more detail below.

One method of determining the charge torque modifier value is shown in FIG. 2B. At 110, the current state of charge of the secondary power source is compared to a threshold value. The current state of charge may be based on a signal communicated to the control module by the secondary power source or inverter. The threshold value may be established by vehicle testing or may be based on the performance attributes of the secondary power source, such as charge capacity and recharge rate. In addition, the threshold value may be set at a level suitable to accommodate energy captured by regenerative braking. If the state of charge is less than the threshold value, then the method continues at block 112. If the state of charge is not less than the threshold value, then the method continues at block 114.

At blocks 112 and 114, an adjustment value is determined. For clarity, the adjustment value determined at blocks 112 and 114 are designated below as first and second adjustment values, respectively.

Figure 3:
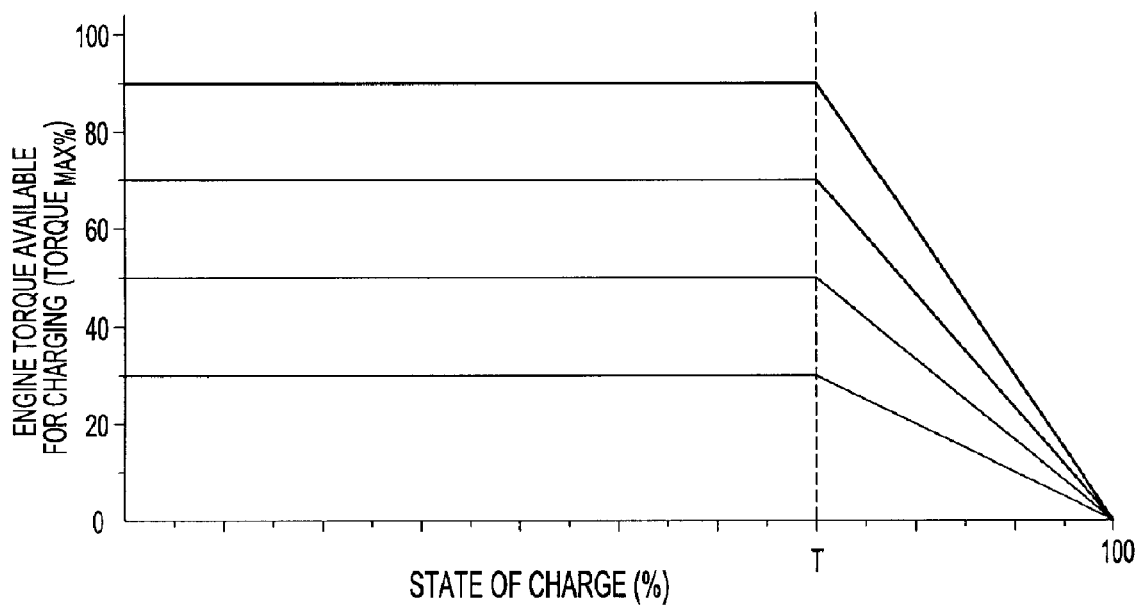
FIG. 3 is an exemplary plot of selected adjustment values in accordance with FIG. 2B.

At 112, the first adjustment value is determined. The first adjustment value may be selected from a look-up table and may be based on $Torque_{MAX\%}$. More specifically, adjustment values are associated with different amounts of engine torque that are available for charging the secondary power source. Some exemplary first adjustment values are shown graphically in FIG. 3. The first adjustment values are represented by the horizontal lines located where the state of charge is less than threshold value T (i.e., left of point T). The first adjustment values are constants associated with each value of $Torque_{MAX\%}$ for each state of charge value less than T.

At 114, the second adjustment value is determined if the state of charge is not less than the threshold value. The second adjustment value may be selected from a look-up table and may be based on $Torque_{MAX\%}$ and the state of charge. More specifically, the second adjustment value decreases as the state of charge increases to help ramp down charging of the power source to provide a smooth transition out of the charge mode and consistent response of the accelerator pedal. Some exemplary second adjustment values are shown graphically in FIG. 3. The second adjustment values are represented by the sloped lines located where the state of charge exceeds the threshold value T (i.e., right of point T). The second adjustment values may decrease linearly or ramp down as the state of charge approaches a fully charged state (100%). Alternatively, the second adjustment value may be determined for any value of $Torque_{MAX\%}$ by calculating the slope of a second adjustment value line connecting the value of $Torque_{MAX\%}$ at the threshold value point and a state of charge of 100%. The first adjustment value may exceed the second adjustment value for a given value of $Torque_{MAX\%}$ to provide greater charging of the secondary power source at low charge levels (i.e., when the state of charge is less than the threshold value).

At 116, the method calculates the charge torque modifier value ($Torque_{MOD}$), which may be expressed as a function of the expression:

$$Torque_{Max\%} * Adjustment$$

where:

$Torque_{Max\%}$ is the torque available for charging the secondary power source expressed as a percentage of the maximum torque output level, and Adjustment is the adjustment value selected in block 112 or 114.

At 118 in FIG. 2A, a target output torque level for the electrical machine is determined. The target output torque is based on the product of the charge torque modifier value ($Torque_{MOD}$) and a charge torque command value provided using an energy management system or subroutine for the secondary power source. The charge torque command value is based on vehicle electrical loads. More specifically, as electrical load increases, the secondary power source discharges faster and the charge torque command value increases to provide more charging.

At 120, the electrical machine is driven at the target output torque level using the control module or motor controller. More specifically, the control module commands an appropriate level of current draw to drive the electrical machine at the desired torque level.

Figure 4:
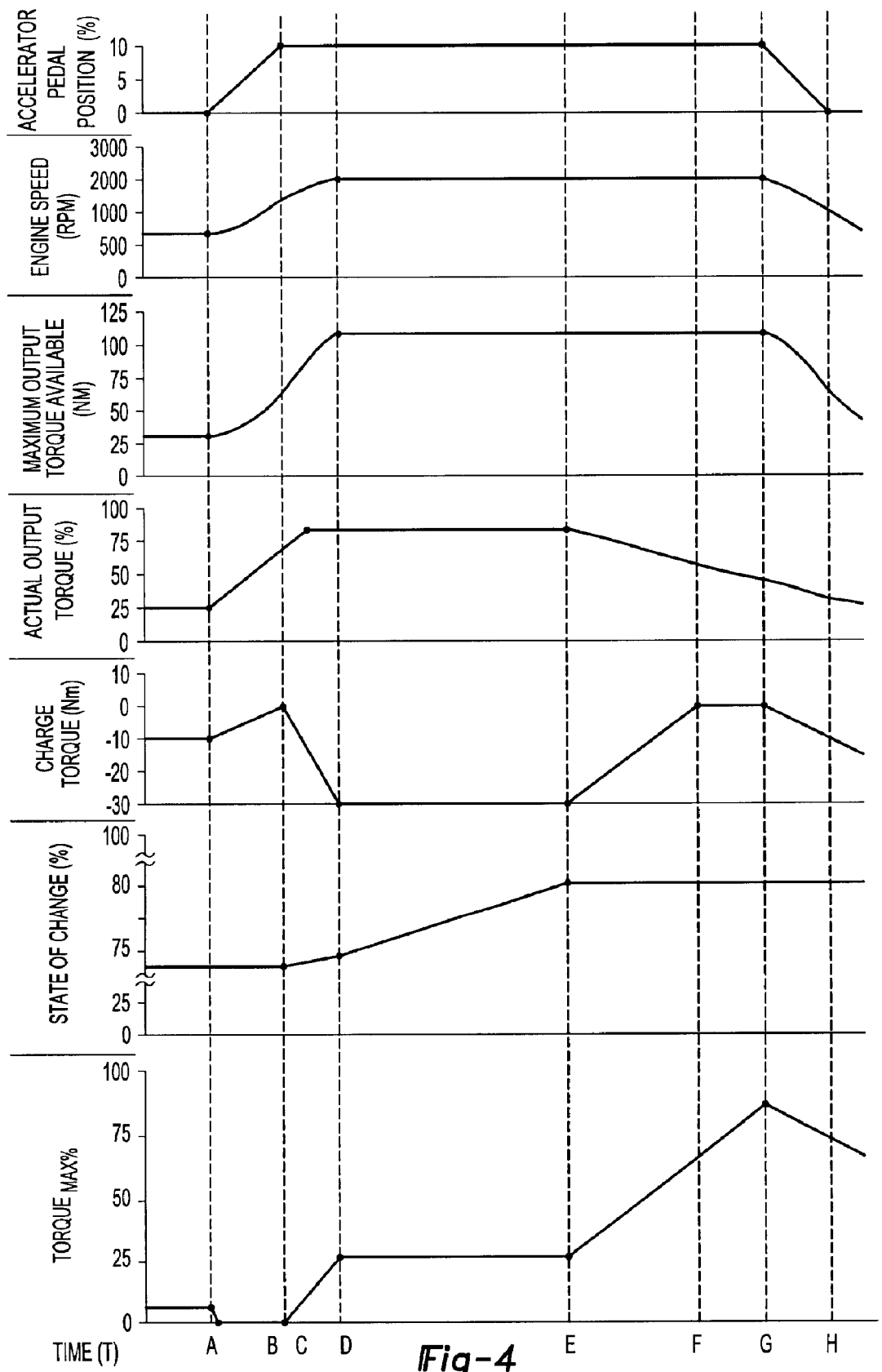
FIG. 4 is an exemplary plot depicting the operation of the hybrid electric vehicle in accordance with the method of the present invention.

Referring to FIG. 4, a exemplary plot depicting operation of the hybrid electric vehicle in accordance with the method of the present invention is shown. The horizontal axis represents time, designated "t". The vertical axes represent different vehicle performance attributes. In the example discussed below, the threshold value for the state of charge is 80% and negative charge torque values indicate charging of the secondary power source.

At time 0 (t=0), the accelerator pedal is fully released (0% actuation), the engine is idling at approximately 800 RPM, and the secondary power source has a state of charge of approximately 74%. The secondary power source is being charged slowly, as indicated by the negative charge torque value.

At time A, accelerator pedal actuation is commenced. In response, the engine speed, maximum output torque available, and actual output torque begin to increase.

From time A to time B, the charge torque decreases (i.e., becomes less negative). No engine torque is used to charge the secondary power source as shown by the zero value for $Torque_{Max\ \%}$. Rather, the engine torque is used to provide vehicle acceleration.

At time B, the accelerator pedal is held at 10%. At time C the actual output torque reaches a value of approximately 80% of the maximum engine torque available at the current operating conditions.

From time B to time D, the engine torque available for charging the secondary power source increases since the engine speed is increasing and the accelerator pedal position has stabilized. Consequently, the value of $Torque_{Max\%}$ begins to increase and the charging of the power source continues as shown by the increasingly negative charge torque value.

From time D to time E, charging of the secondary power source continues until the threshold value of 80% is reached at time E.

From time E to time F, the rate of charging is ramped down or decreased linearly as indicated by the less negative charge torque value. As the charging is ramped down, more engine torque is available to propel the vehicle or charge a power source as indicated by the increase in $Torque_{Max\ \%}$. In addition, the actual output torque is ramped down to inhibit surging of the engine or vehicle as more torque becomes available and to provide stable accelerator pedal feel.

Finally, at time G the accelerator pedal is released. In response, the engine speed, maximum output torque available, charge torque, and $Torque_{Max\ \%}$ begin to decrease accordingly from time G to time H.

While the best mode for carrying out the invention has been described in detail, those familiar with the art to which this invention relates will recognize various alternative designs and embodiments for practicing the invention as defined by the following claims.

What is claimed is:

1. A method of controlling charging of a power source of a hybrid vehicle, the hybrid vehicle comprising a set of power sources including a primary power source and at least one secondary power source, and an electrical machine adapted to be driven by at least one member of the set of power sources, the method comprising:

determining a maximum output torque level of the primary power source;

determining a state of charge of the secondary power source;

determining a charge torque modifier value based on the maximum output torque level and the state of charge;

determining a target torque level for the electrical machine based on the charge torque modifier value; and driving the electrical machine at the target torque level with the primary power source to charge the secondary power source.

2. The method of claim 1 wherein the step of determining the maximum output torque level further includes determining whether the primary power source is providing output torque.

3. The method of claim 1 wherein the step of determining the charge torque modifier value further comprises comparing a state of charge of the secondary power source to a threshold value and selecting a first adjustment value if the state of charge is less than the threshold value and selecting a second adjustment value if the state of charge is not less than the threshold value.

4. The method of claim 3 wherein the first adjustment value is greater than the second adjustment value.

5. The method of claim 3 wherein the first adjustment value is a constant based on the maximum output torque level.

6. The method of claim 3 wherein the second adjustment value is based on the maximum output torque level and the state of charge.

7. The method of claim 3 wherein the second adjustment value decreases linearly as the state of charge increases.

8. The method of claim 3 wherein the step of determining a charge torque modifier value is based on the state of charge and an actual output torque of the primary power source expressed as a percentage of the maximum output torque level.

9. The method of claim 1 wherein the primary power source is an internal combustion engine.

10. The method of claim 1 wherein the at least one secondary power source is a battery.

11. The method of claim 1 wherein the electrical machine is a starter-alternator.

12. The method of claim 1 wherein the electrical machine is a motor-generator.

13. A method for controlling charging of a power source of a hybrid electric vehicle, the hybrid electric vehicle including the power source, an engine, and an electrical machine selectively coupled to the engine and adapted to charge the power source, the method comprising:

determining whether the engine is running;

determining whether the electrical machine is being driven by the engine and is charging the power source;

determining a maximum output torque level of the engine;

comparing a state of charge of the power source to a threshold value;

selecting an adjustment value based on an amount of torque available to charge the power source;

calculating a charge torque modifier value based on the adjustment value;

determining a target torque level for the electrical machine based on the charge torque modifier value; and driving the electrical machine at the target torque level with the engine to charge the power source;

wherein the charge torque modifier value is a constant if the state of charge is less than the threshold value and the charge torque modifier value decreases as the state of charge increases if the state of charge is greater than the threshold value.

14. The method of claim 13 wherein the charge torque modifier decreases linearly as the state of charge increases if the state of charge is greater than the threshold value.

15. The method of claim 13 wherein the charge torque modifier value is determined as a function of the expression:

$$Torque_{Max\%} * Adjust$$

where:
$Torque_{Max\%}$ is the maximum output torque level of the engine expressed as a percentage, and
Adjust is the adjustment value selected.

16. The method of claim 15 wherein the maximum output torque level of the engine expressed as a percentage ($Torque_{Max\%}$) is determined as a function of the expression:

$$(Torque_{Max} - Torque_{Actual})/Torque_{Max}$$

where:
$Torque_{Max}$ is the maximum output torque level of the engine, and
$Torque_{Actual}$ is the current output torque of the engine.

17. A method of controlling charging of a power source of a hybrid electric vehicle, the hybrid electric vehicle comprising a primary power source, a secondary power source, an electrical machine adapted to be driven by the primary or secondary power sources, and an accelerator pedal, the method comprising:
   determining a maximum output torque level of the primary power source;
   determining a state of charge of the secondary power source;
   comparing the state of charge to a threshold value;
   selecting an adjustment value;
   determining a charge torque modifier value based on the adjustment value and an actual output torque of the primary power source expressed as a percentage of the maximum output torque level;
   determining a target torque level for the electrical machine based on the charge torque modifier value; and
   driving the electrical machine at the target torque level with the primary power source to charge the secondary power source;
   wherein when the state of charge exceeds a threshold value the target torque level decreases linearly as the output torque of the primary power source increases to provide a consistent level of vehicle acceleration as the accelerator pedal is actuated.

18. The method of claim 17 wherein the charge torque modifier value is a constant if the state of charge is less than the threshold value.

19. The method of claim 17 wherein the step of selecting an adjustment value further comprises selecting a first adjustment value if the state of charge is less than the threshold value and selecting a second adjustment value if the state of charge is not less than the threshold value.

20. The method of claim 19 wherein the first adjustment value is greater than the second adjustment value.

* * * * *

UNITED STATES PATENT AND TRADEMARK OFFICE
CERTIFICATE OF CORRECTION

PATENT NO. : 7,605,561 B2 Page 1 of 1
APPLICATION NO. : 10/711499
DATED : October 20, 2009
INVENTOR(S) : Yamazaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1025 days.

Signed and Sealed this

Fifth Day of October, 2010

David J. Kappos
*Director of the United States Patent and Trademark Office*